Sept. 12, 1939. R. H. BARNARD 2,172,899
MAKING GLASS
Filed April 11, 1938 2 Sheets-Sheet 2
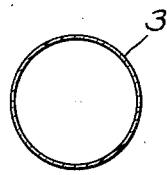
Fig. 3
Fig. 4
Fig. 5
Fig. 6
Fig. 7
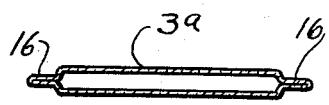
Fig. 8
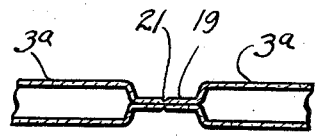
Fig. 9
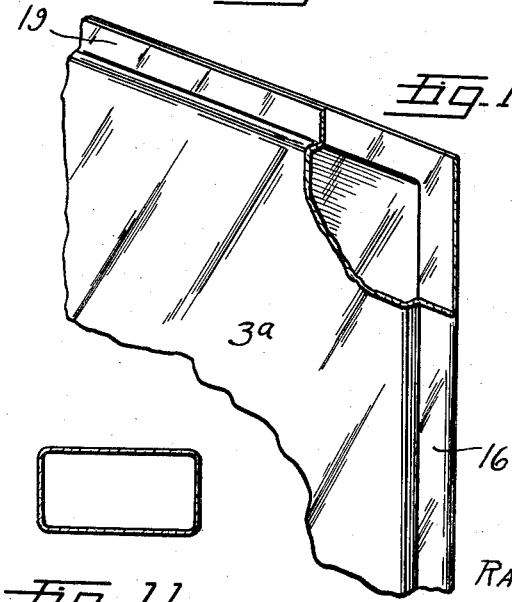
Fig. 12
Fig. 11
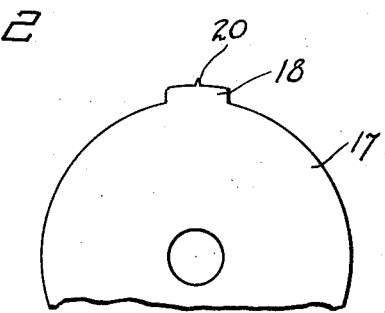
Fig. 10
INVENTOR.
RANDOLPH H. BARNARD
BY
Barnes, Kisselle, Laughlin & Raisch
ATTORNEYS.

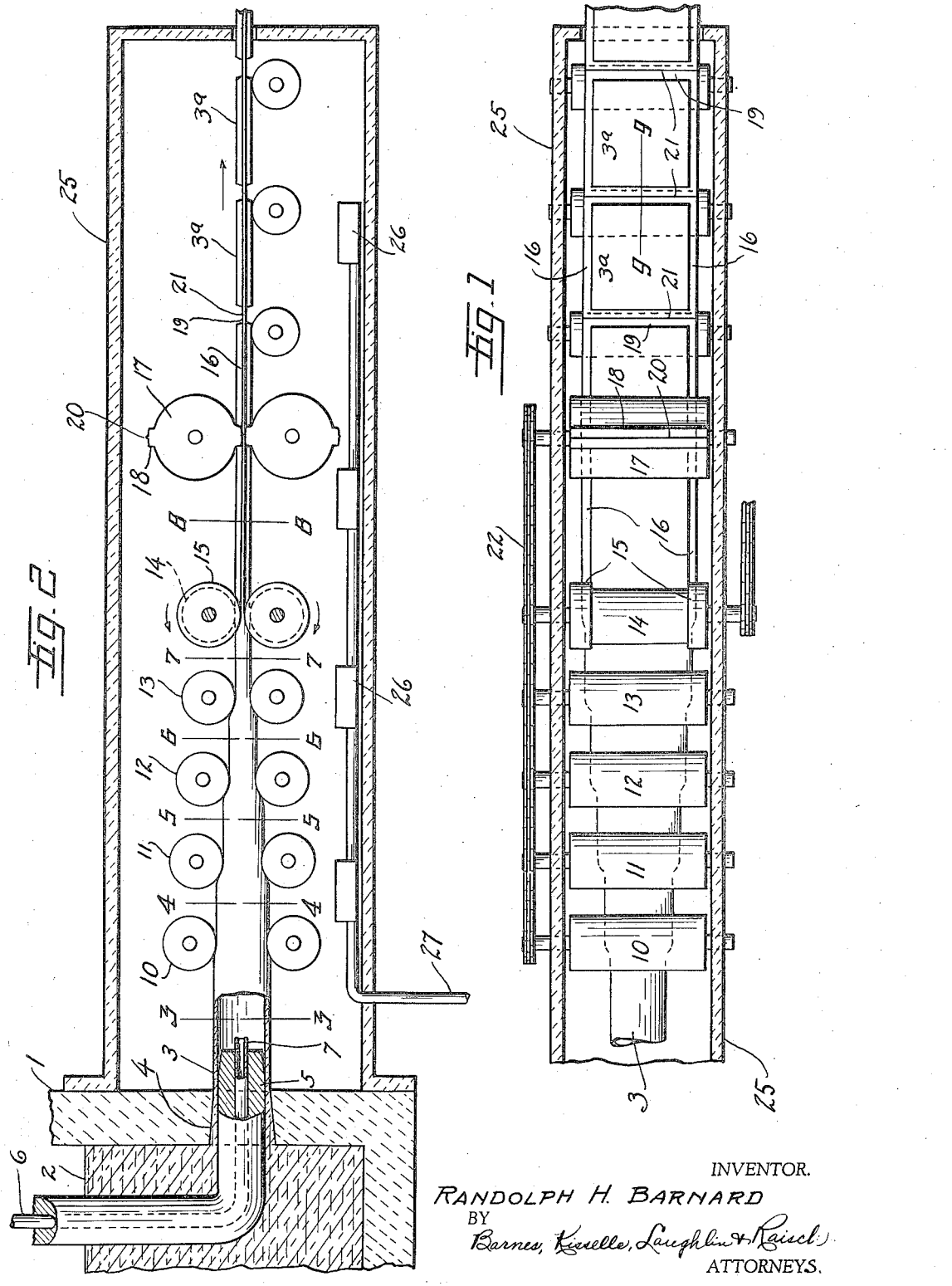

Patented Sept. 12, 1939

2,172,899

UNITED STATES PATENT OFFICE 2,172,899

MAKING GLASS

Randolph H. Barnard, Toledo, Ohio

Application April 11, 1938, Serial No. 201,291

10 Claims. (Cl. 49—79)

This invention relates to the making of glass for glazing purposes. The invention is directed particularly to a method of manufacturing cellular glass units for use as window panes.

At the present time much attention is being devoted to the insulation of buildings of all types, particularly residential buildings, and to the conditioning of the air in the buildings. The windows, however, remain as a structure through which the heat losses are high; and where the air is conditioned to maintain adequately high relative humidity, condensate forms on the windows.

The present invention contemplates a method of making glass for glazing purposes which will keep the window construction in step with these other developments. To this end panels of glass are formed from an integral body of molten or plastic glass wherein the finished panel or pane has spaced walls with a sealed inner area. This construction forms a dead space between sheets of glass which may contain a gas or air, whether higher or lower than atmospheric pressure, and which has insulating qualities from the standpoint of the prevention of heat losses therethrough. Generally, glass of tubular form is obtained from a supply of molten glass, and this tubular form is acted upon before it solidifies to shape the double walled panes of glass with the sealed inner chamber. The process is preferably of the continuous type where the molten glass is drawn from or flows from a supply of molten glass, and is moved preferably with a uniform speed and acted upon to provide a continuous supply of glazing units.

In the accompanying drawings

Fig. 1 is a top plan view of an arrangement for carrying out the invention, with some of the parts shown in section.

Fig. 2 is a side view with some parts in section.

Fig. 3 is a sectional view taken substantially on line 3—3 of Fig. 2.

Figs. 4, 5, 6, 7 and 8 are cross sectional views showing the progressive change in the shape of the glass, the views being taken on the corresponding section lines of Fig. 2.

Fig. 9 is a cross sectional view taken substantially on line 9—9 of Fig. 1 illustrating a transverse seam structure.

Fig. 10 is an enlarged view of a forming roll for fashioning the transverse seam structure and for scoring the glass.

Fig. 11 is a cross sectional view similar to Fig. 3 illustrating a modified shape of tubular form which may be used.

Fig. 12 is a perspective view of a portion of a finished panel with parts cut away.

The walls of a glass furnace are generally illustrated at 1 in which there is a body of molten glass 2, and the molten glass is caused to be drawn from or exuded from or otherwise obtained from the furnace in the form of a tubular structure 3. Those skilled in the glass art are versed in the procedure of obtaining tubular glass in this nature and one particular manner of obtaining tubular glass is shown in my application Serial No. 58,443, which issued March 7, 1939, as Patent No. 2,150,017. However, as illustrated, the walls of the glass furnace have an outlet 4 in which there is disposed a mandrel 5 so as to form a circular outlet opening. For reasons which will presently appear, the mandrel is provided with a conduit 6 opening into the tubular form as at 7, and this conduit is for the passage of air or a suitable gas. As illustrated in Fig. 3, the drawn tube may be of circular formation, although other tubular shapes may do, such, for example, as the rectangular shape shown in Fig. 11.

In carrying out the invention this tubular shape is successively acted upon as it travels, it being understood that the glass issues from and travels preferably with a substantially uniform lengthwise movement. The glass in the furnace is referred to as being molten, as this is the usual term applied to the glass art, and after the glass issues from the furnace it is acted upon before it has solidified. For convenience it is said herein that the glass is acted upon while plastic, and this term is used to cover all conditions of the glass from its molten condition where it issues from the furnace to that condition where it is no longer sufficiently tractable to be acted upon for forming or shape changing purposes.

One apparatus for carrying out the invention comprises a series of opposed forming rolls, with one roll of each set positioned above and one roll positioned below the glass form. The first set of rolls is illustrated at 10 and it serves to flatten the tube somewhat as illustrated in Fig. 4. The second set of rolls 11 flattens the tube a little more as shown in Fig. 5. A third set of rolls 12 increases the flattening action as illustrated in Fig. 6 and a fourth set of rolls 13 substantially completes the flattening and elongating action so that the glass shape may be substantially as illustrated in Fig. 7. Then the glass shape is acted upon by a set of rolls 14 and these rolls have a central portion which may not further tend to flatten the tubular shape and they have enlarged ends 15 which serve to collapse the opposite edges of the hollow glass form to form edge portions 16, as shown in Fig. 8.

As the glass continues to move it is subjected to a forming action to collapse the shape transversely at spaced locations, and this is done by a set of rollers 17 having transverse ribs 18 which function as shown in Fig. 2 to collapse the glass transversely and form seams 19. The seams 19 are quite similar to the edge portions or seams 16, thus it will be noted that the issuing glass is progressively acted upon and shaped to form a series of connected panels 3a. This treatment of the glass, as mentioned above is carried out while the glass is plastic and sufficiently tractable, and when the seam portions 16 and 19 are collapsed, the collapsed glass portions unite or weld to each other, thus completely sealing the space. To facilitate separation of the panels, the ribs 18 may have transverse, relatively sharp, edges or projections 20 for scoring the seam 19 substantially at its mid portion as illustrated at 21, and the panels may be separated on these score lines. The several rolls may be driven by suitable means, as generally indicated at 22.

In order to prevent the glass form from collapsing as it is treated in this manner, air or other suitable gas which may be preheated is introduced under requisite pressure through the tube 6. A pressure will be selected which will maintain the hollow glass of the desired form and prevent collapsing, and this may depend upon the plasticity of the glass, the size of the tubular form, and the speed of movement and other factors. If the gas or air which is introduced is not preheated, it will, in any event, become heated by the hot glass, and when the rolls 17 complete the seam 19, the gas is trapped in the cell of the panel formed by that seam. However, upon cooling, the gas or air contracts so that the pressure may lower to a point below atmospheric pressure, thus forming a partial vacuum.

The process may be carried out under conditions where the glass is subjected to a controlled heat for maintaining the desired plasticity, and to this end the several rolls may be enclosed in a housing 25, and the housing may be heated by a suitable number of gas burners 26 fed from a gas supply line 27. As the glass passes from the housing 25 the glass may be appropriately annealed or otherwise treated, and this may be done before or after the panels are separated from each other.

Thus a continuous process is provided for making cellular glass panels, particularly useful for glazing purposes, and for use in the so-called casement or steel window frames. Of course, the panels may be used in other types of frames. When the panels are set into the frame, the edge seams 16 and 19 may be disposed substantially completely within the frame and mullions, so that substantially the exposed portion of the glass is that of the double or cellular formation. Thus the seams form projecting edge ribs for mounting purposes. It will be understood that panels of different sizes may be made. The width may be varied by varying the diameter or cross dimensions of the drawn tubing, and by variation in the width of the forming rolls, and the other dimension of the panels may be determined by the diameter of the rolls 17 or the number of transverse ribs on the rolls or both.

I claim:

1. The method of making glass panels for glazing which comprises, causing glass in tubular form to issue from a supply of molten glass, forming the glass as it moves and while plastic into a relatively flat hollow form, collapsing the edges of the tubular form and collapsing the tubular form transversely at spaced locations, leaving other portions spaced apart, while the glass is plastic so that the collapsed portions unite into seams to form sealed hollow panels and separating the panels substantially at the transverse seams.

2. The method of making glass panels for glazing which comprises, causing glass in tubular form to issue from a supply of molten glass, forming the glass as it moves and while plastic into a relatively flat hollow form, collapsing the edges of the tubular form and collapsing the tubular form transversely at spaced locations only while the glass is plastic so that the collapsed portions unite into seams to form sealed hollow panels with a projecting rib around their edges and separating the panels substantially at the transverse seams.

3. The method of making glass panels for glazing which comprises, causing glass in tubular form to issue from a supply of molten glass, forming the glass as it moves and while plastic into a relatively flat hollow form, collapsing the edges of the tubular form and collapsing the tubular form transversely at spaced locations only while the glass is plastic so that the collapsed portions unite into seams to form sealed hollow panels, and separating the panels substantially on a center line of the transverse seams.

4. The method of making glass panels for glazing which comprises, moving plastic glass in the form of a relatively flat hollow cross sectional shape longitudinally, collapsing the edges of the hollow form and collapsing the hollow form transversely at spaced locations only while the glass is plastic so that the collapsed portions unite into seams to define hollow panels sealed around their edges and separating the panels substantially at the transverse seams.

5. The method of making glass panels for glazing which comprises, forming glass into a relatively flat hollow cross sectional shape, collapsing the opposite closed edges of the hollow cross sectional form to bring the edges together and collapsing the hollow cross sectional form transversely at spaced locations only to bring portions of the glass together, while the glass is plastic, so that the collapsed portions unite into seams and thus define connected hollow panels sealed around their edges by the seams and separating the panels substantially at the transverse seams.

6. The method of making glass panels for glazing which comprises, causing glass in tubular form to issue from a supply of molten glass, moving the tubular form continuously with lengthwise movement, progressively flattening the tubular form until it is of a relatively flat hollow cross sectional shape, collapsing the edges and collapsing the hollow cross sectional shape transversely at spaced locations only, while the glass is plastic, so that the collapsed portions unite into seams to form hollow panels sealed around their edges by projecting seams, and then separating the glass panels substantially at the transverse seams.

7. The method of making glass panels for glazing which comprises, causing glass in tubular form to issue from a supply of molten glass, moving the tubular form continuously with lengthwise movement, progressively flattening the tubular form until it is of a relatively flat hollow cross sectional shape, collapsing the edges and collapsing the hollow cross sectional shape transversely at spaced locations only, while the glass is plastic so that the collapsed portions unite into seams to form hollow panels sealed around their edges by projecting seams, introducing gas under pressure into the tubular form to sustain the hollow formation, and then separating the glass panels substantially at the transverse seams.

8. The method of making glass panels for glazing which comprises, causing glass in tubular form to issue from a supply of molten glass, moving the tubular form continuously with lengthwise movement, progressively flattening the tubular form until it is of a relatively flat hollow cross sectional shape, collapsing the edges and collapsing the hollow cross sectional shape transversely at spaced locations only, while the glass is plastic so that the collapsed portions unite into seams to form hollow panels sealed around their edges by projecting seams, introducing a hot gas under pressure into the tubular form to sustain the hollow formation, and then separating the glass panels substantially at the transverse seams.

9. The method of making glass panels for glazing which comprises, causing glass to issue in tubular form from a supply of molten glass, moving the tubular form lengthwise, flattening the tubular form until it has a relatively flat hollow cross sectional shape, introducing gas under pressure into the tubular form for sustaining the hollow shape, collapsing only the closed edges to form projecting edge portions and collapsing the flat hollow cross sectional form transversely at spaced locations only while the glass is plastic so that the transversely collapsed portions unite into transverse seams, to define connected hollow cross sectional panels sealed around their edges, and then separating the panels substantially at the transverse seams.

10. The method of making glass panels for glazing which comprises, causing glass to issue in tubular form from a supply of molten glass, moving the tubular form lengthwise, progressively flattening the tubular form as it moves until it has a relatively flat hollow cross sectional shape, introducing gas under pressure into the tubular form for sustaining the hollow shape, collapsing the closed edges to form projecting edge portions and collapsing the flat hollow cross sectional form transversely at spaced locations only, while the glass is plastic so that the transversely collapsed portions unite into transverse seams to define connected hollow cross sectional panels sealed around their edges, and then separating the panels substantially on a center line of the transverse seams leaving on each panel a projecting edge adapted to be received in a window frame or mullion.

RANDOLPH H. BARNARD.